(12) United States Patent
Koga (10) Patent No.: US 10,811,653 B2
(45) Date of Patent: Oct. 20, 2020

(54) LITHIUM ION BATTERY AND METHOD FOR PRODUCING LITHIUM ION BATTERY

(71) Applicant: TOYOTA JIDOSHA KABUSHIKI KAISHA, Toyota-shi, Aichi-ken (JP)

(72) Inventor: Hideyuki Koga, Numazu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 23 days.

(21) Appl. No.: 15/655,375

(22) Filed: Jul. 20, 2017

(65) Prior Publication Data
US 2018/0047965 A1    Feb. 15, 2018

(30) Foreign Application Priority Data
Aug. 15, 2016    (JP) .................................. 2016-159209

(51) Int. Cl.
| | |
|---|---|
| H01M 2/16 | (2006.01) |
| H01M 10/0525 | (2010.01) |
| H01M 10/0566 | (2010.01) |
| H01M 10/058 | (2010.01) |
| H01M 2/14 | (2006.01) |
| H01M 4/38 | (2006.01) |

(Continued)

(52) U.S. Cl.
CPC ........... *H01M 2/1646* (2013.01); *H01M 2/14* (2013.01); *H01M 2/145* (2013.01); *H01M 4/381* (2013.01); *H01M 4/382* (2013.01); *H01M 4/386* (2013.01); *H01M 4/505* (2013.01); *H01M 4/525* (2013.01); *H01M 10/052* (2013.01); *H01M 10/058* (2013.01); *H01M 10/0525* (2013.01); *H01M 10/0568* (2013.01); *H01M 10/0569* (2013.01); *H01M 2300/004* (2013.01)

(58) Field of Classification Search
CPC ............. H01M 2/14–16; H01M 2/164; H01M 2/1646; H01M 2/1673
See application file for complete search history.

(56) References Cited

U.S. PATENT DOCUMENTS

| | | |
|---|---|---|
| 2008/0297981 A1 | 12/2008 | Endo et al. |
| 2014/0038054 A1 | 2/2014 | Tojigamori et al. |
| 2014/0234725 A1* | 8/2014 | Ogawa .................. H01M 4/131 429/304 |

FOREIGN PATENT DOCUMENTS

| | | |
|---|---|---|
| JP | 2008-294314 A | 12/2008 |
| JP | 2010219392 A | 9/2010 |

(Continued)

*Primary Examiner* — Stephan J Essex
(74) *Attorney, Agent, or Firm* — Sughrue Mion, PLLC (57) ABSTRACT

An object of the present disclosure is to provide a lithium ion battery with low resistance to ion conduction. The present disclosure achieves the object by providing a lithium ion battery comprising: a cathode active material; an anode active material; an insulating oxide with neither electron conductivity nor ion conductivity that is formed in an interface between the cathode active material and the anode active material, and contains at least one kind of an element included in the cathode active material and at least one kind of an element included in the anode active material; and an electrolyte material that is an ion conducting path between the cathode active material and the anode active material; wherein the cathode active material comprises Li, at least one kind of Co, Mn, Ni, and Fe, and O; and the anode active material comprises at least one kind of Si, Li and Ti.

6 Claims, 7 Drawing Sheets

(51) Int. Cl.
*H01M 4/505* (2010.01)
*H01M 4/525* (2010.01)
*H01M 10/052* (2010.01)
*H01M 10/0568* (2010.01)
*H01M 10/0569* (2010.01)

(56) References Cited

FOREIGN PATENT DOCUMENTS

| | | |
|---|---|---|
| JP | 2013-137947 A | 7/2013 |
| JP | 5337546 B2 | 11/2013 |
| JP | 2014-029810 A | 2/2014 |
| JP | 2014-116129 A | 6/2014 |

\* cited by examiner

LITHIUM ION BATTERY AND METHOD FOR PRODUCING LITHIUM ION BATTERY

TECHNICAL FIELD

The present disclosure relates to a lithium ion battery.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has presently drawn attention from the viewpoint of a high energy density among various kinds of batteries.

For example, Patent Literature 1 discloses a lithium ion secondary battery comprising a cathode, an anode, a separator disposed between the cathode and the anode, and a nonaqueous liquid electrolyte.

Also, Patent Literature 2 discloses an all solid state lithium ion secondary battery comprising a cathode material layer, a sulfur-based solid electrolyte material layer, and an anode material layer that are stacked.

Patent Literature 3 discloses an all solid state battery comprising: a mixture electrode layer in which cathode active material particles and anode active material particles are tangled; and a solid electrolyte material part formed by the reaction of the cathode active material particles with the anode active material particles in the interfaces between the cathode active material particles and the anode active material particles. The all solid state battery disclosed here has high energy density.

CITATION LIST

Patent Literatures

Patent Literature 1: Japanese Patent Application Laid-Open (JP-A) No. 2013-137947
Patent Literature 2: JP-A No. 2014-116129
Patent Literature 3: JP-A No. 2014-029810

SUMMARY OF DISCLOSURE

Technical Problem

In lithium batteries, ion conducting paths become longer as the distance between a cathode active material and an anode active material, between which a liquid electrolyte is present, becomes longer; as the result, the resistance of ion conductivity increases. The present disclosure has been made in view of the above circumstances, and a main object thereof is to provide a lithium ion battery with low resistance of ion conductivity.

Solution to Problem

To achieve the object, the present disclosure provides a lithium ion battery comprising: a cathode active material; an anode active material; an insulating oxide with neither electron conductivity nor ion conductivity that is formed in an interface between the cathode active material and the anode active material, the insulating oxide contains at least one kind of an element included in the cathode active material and at least one kind of an element included in the anode active material; and an electrolyte material that is an ion conducting path between the cathode active material and the anode active material; wherein the cathode active material comprises Li, at least one kind of Co, Mn, Ni, and Fe, and O; and the anode active material comprises at least one kind of Si, Li and Ti.

According to the present disclosure, the insulating oxide with neither electron conductivity nor ion conductivity is formed in the interface between the cathode active material and the anode active material, so that the distance between the cathode active material and the anode active material may be shortened while inhibiting short circuits, which results in shortening the ion conducting paths, and thereby a lithium ion battery with low resistance of ion conductivity may be obtained.

In the disclosure, the lithium ion battery may be the lithium ion battery comprising a mixture electrode layer in which the cathode active material and the anode active material are tangled; and the insulating oxide is present in neither an interface of the anode active materials nor an interface of the cathode active materials.

In the disclosure, the insulating oxide may comprise at least one kind of $SiO_2$, $Li_2O$, and $TiO_2$.

In the disclosure, the cathode active material may comprise at least one kind of $Li_xMO_2$ ($0.5<x<1.5$; M is at least one kind of Co, Mn, and Ni), $LiMn_2O_4$, $LiNi_{0.5}Mn_{1.5}O_4$, $LiCoMnO_4$, and $LiMPO_4$ (M is at least one kind of Fe, Co, Mn, and Ni).

In the disclosure, the anode active material may comprise at least one kind of a simple substance of Si, a simple substance of Li, and $Li_4Ti_5O_{12}$.

In the disclosure, the electrolyte material may be a liquid electrolyte.

Also, the present disclosure provides a method for producing a lithium ion battery comprising: a preparing step of preparing an electrode member in which a cathode active material contacts an anode active material; a heat treating step of heat treating the electrode member to form an insulating oxide with neither electron conductivity nor ion conductivity that contains at least one kind of an element included in the cathode active material and at least one kind of an element included in the anode active material, in an interface between the cathode active material and the anode active material; and an adding step of adding an electrolyte material that is an ion conducting path between the cathode active material and the anode active material, to the electrode member, during the preparing step or after the heat treating step; wherein the cathode active material comprises Li, at least one kind of Co, Mn, Ni, and Fe, and O, and the anode active material comprises at least one kind of Si, Li and Ti.

According to the present disclosure, by heat treating, an insulating oxide with neither electron conductivity nor ion conductivity is formed between the cathode active material and the anode active material in a self-forming manner, so that the insulating oxide is formed selectively in the required part; as the result, the distance between the cathode active material and the anode active material may be shortened while inhibiting short circuits, which results in shortening the ion conducting paths, and thereby a lithium battery with low resistance of ion conductivity may be obtained.

Advantageous Effects of Disclosure

The lithium ion battery of the present disclosure exhibits effects such as the low resistance of ion conductivity.

DESCRIPTION OF EMBODIMENTS

A lithium ion battery of the present disclosure and a method for producing the lithium ion battery are hereinafter described in detail.

A. Lithium Ion Battery

Figure 1:
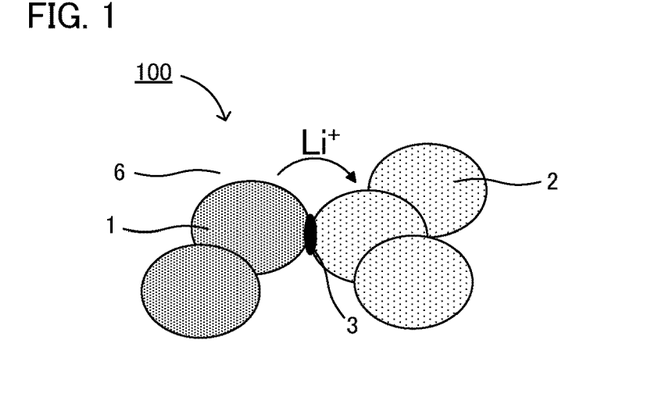
FIG. 1 is a schematic cross-sectional view illustrating an example of the lithium ion battery of the present disclosure.

FIG. 1 is a schematic cross-sectional view illustrating an example of a lithium ion battery in the present disclosure. Lithium ion battery 100 illustrated in FIG. 1 comprises a cathode active material 1 and an anode active material 2. In addition, insulating oxide 3 with neither electron conductivity nor ion conductivity is formed in the interface between cathode active material 1 and anode active material 2. This insulating oxide 3 contains at least one kind of an element included in cathode active material 1 and at least one kind of an element included in anode active material 2. Also, lithium ion battery 100 comprises, around cathode active material 1 and anode active material 2, electrolyte material 6 that is an ion conducting path giving and receiving ions between cathode active material 1 and anode active material 2.

According to the present disclosure, the insulating oxide with neither electron conductivity nor ion conductivity is formed in the interface between the cathode active material and the anode active material, so that the distance between the cathode active material and the anode active material may be shortened while inhibiting short circuits, which results in shortening the ion conducting paths, and thereby a lithium ion battery with low resistance of ion conductivity may be obtained.

Patent Literature 3 discloses an all solid state battery in which the energy density is improved by forming a solid electrolyte material part selectively in the required part. Here, a solid electrolyte material with only ion conductivity but without electron conductivity is self-formed by the reaction of the cathode active material with the anode active material, so that the amount of the solid electrolyte material may be minimized and the proportion of active materials may be relatively increased, and thereby the improvement of the energy density is intended. On the other hand, in the present disclosure, the insulating oxide with neither electron conductivity nor ion conductivity is self-formed by the reaction of the cathode active material with the anode active material, so that the distance between the cathode active material and the anode active material may be shortened while inhibiting short circuits, which results in shortening the ion conducting paths, and thereby the decrease in the resistance of ion conductivity is intended; thus, the technical idea differs from that of Patent Literature 3. Also, when a solid electrolyte material is self-formed as in Patent Literature 3, various conditions such as the composition and the heat treating temperature should be strictly controlled to obtain the desired ion conductivity; however, when an insulating oxide is shelf-formed as in the present disclosure, the strict control of various conditions is unnecessary; thus the present disclosure has an advantage that an insulating oxide is comparatively more easily formed.

Figure 2:
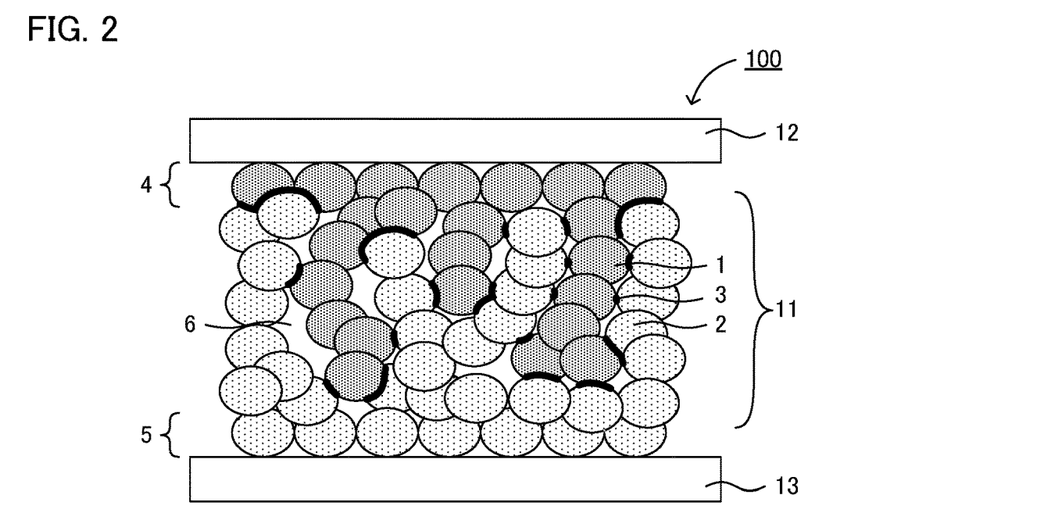
FIG. 2 is a schematic cross-sectional view illustrating an additional example of the lithium ion battery of the present disclosure.

Also, as an additional example of the lithium ion battery in the present disclosure, the battery may be in the form illustrated in the schematic cross-sectional view in FIG. 2. Lithium ion battery 100 illustrated in FIG. 2 has mixture electrode layer 11 in which cathode active material 1 and anode active material 2 are tangled. In addition, insulating oxide 3 with neither electron conductivity nor ion conductivity is formed in the interface between cathode active material 1 and anode active material 2. This insulating oxide 3 is formed in neither the interface between cathode active materials 1 nor the interface between anode active materials 2, but formed selectively in the interface between cathode active material 1 and anode active material 2. Short circuit preventing layer 4 comprising cathode active material 1 is formed on the upper surface of mixture electrode layer 11, and short circuit preventing layer 5 comprising anode active material 2 is formed on the bottom surface of mixture electrode layer 11. Also, cathode current collector 12 is disposed so as to contact short circuit preventing layer 4, and anode current collector 13 is disposed so as to contact short circuit preventing layer 5. Further, mixture electrode layer 11 comprises electrolyte material 6 that is an ion conducting path between cathode active material 1 and anode active material 2.

As in the above structure, the mixture electrode layer, in which the cathode active material and the anode active material are tangled, allows the distance between the cathode active material and the anode active material to be short, and thus short ion conducting paths may increase, and thereby a lithium ion battery with high output may be obtained.

The lithium ion battery is hereinafter described in each constitution.

1. Cathode Active Material

The cathode active material is an oxide active material comprising Li, at least one kind of Co, Mn, Ni, and Fe, and O. The cathode active material is preferably an active material that may react with the later described anode active material to form the desired insulating oxide.

As the cathode active material, cathode active materials applicable to lithium ion batteries may be appropriately used. Examples of such a cathode active material may include rock salt bed type active materials such as $Li_xMO_2$ ($0.5<x<1.5$; M is at least one kind of Co, Mn, and Ni) and $LiNi_{1/3}Co_{1/3}Mn_{1/3}O_2$, spinel type active materials such as lithium manganese oxide ($LiMn_2O_4$), $Li(Ni_{0.5}Mn_{1.5})O_4$, and $LiCoMnO_4$, and olivine type active materials such as $LiMPO_4$ (M is at least one kind of Fe, Co, Mn, and Ni).

The cathode active material is not limited to any particular shape, but for example, it is preferably in a granular shape. In that case, the average particle size (D50) of the cathode active material is not limited to any size. For example, the size is in a range of 1 nm to 100 μm, and preferably in a range of 10 nm to 30 μm.

2. Anode Active Material

The anode active material is an active material comprising at least one kind of Si, Li and Ti. The anode active material is preferably an active material that may react with the above described cathode active material to form the desired insulating oxide.

Examples of the anode active material may include a simple substance, an alloy, and an oxide of the above element (Si, Li, and Ti). Above all, a simple substance of Si, a simple substance of Li, and $Li_4Ti_5O_{12}$ are preferable.

The anode active material is not limited to any particular shape, but for example, it is preferably in a granular shape. In that case, the average particle size (D50) is not limited to any size. For example, the size is in a range of 1 nm to 100 μm, and preferably in a range of 10 nm to 30 μm.

3. Insulating Oxide

The insulating oxide contains at least one kind of an element included in the cathode active material and at least one kind of an element included in the anode active material. The insulating oxide is preferably formed by the reaction of the above described cathode active material with the above described anode active material.

Here, the insulating oxide refers to an oxide with neither electron conductivity nor ion conductivity. No electron conductivity means that, for example, the electron conductivity at a normal temperature (25° C.) is $1.0 \times 10^{-6}$ S/cm or less. Also, no ion conductivity means that, for example, the ion conductivity at a normal temperature (25° C.) is $1.0 \times 10^{-8}$ S/cm or less.

The insulating oxide is not limited to any oxide, but for example, the oxide preferably contains at least one kind of Si, Li, and Ti. In other words, it is preferable that O included in the cathode active material reacts with Si, Li, or Ti included in the anode active material in the mutual diffusion, and thereby the insulating oxide containing these elements is formed. Examples of the insulating oxide to be formed may include $SiO_2$, $Li_2O$, and $TiO_2$.

The average thickness of the insulating oxide is not limited. For example, the average thickness is preferably 10 nm or more, and preferably in a range of 50 nm to 200 nm. The average thickness of the insulating oxide may be determined by the observation using a scanning electron microscope (SEM) or a transmission electron microscope (TEM).

4. Mixture Electrode Layer

The mixture electrode layer is a layer in which the cathode active material and the anode active material are tangled, and is preferably a layer obtained by mixing the cathode active material and the anode active material, for example. Also, the desired insulating oxide is preferably formed in the interface between the cathode active material and the anode active material, and it is preferable that the insulating oxide is formed neither in the interface between the cathode active materials nor the interface between the anode active materials.

The mixture electrode layer contains at least the cathode active material, the anode active material, and the insulating oxide. The mixture electrode layer may comprise substantially only the cathode active material, the anode active material, and the insulating oxide, and may contain an additional component. Examples of the additional component may include a conductive material.

The proportion of the cathode active material and the anode active material in the mixture electrode layer is not limited. For example, the anode active material is, per 100 parts by weight of the cathode active material, preferably in a range of 0.01 parts by weight to 100 parts by weight, and more preferably in a range of 1 part by weight to 70 parts by weight. The reason therefor is that the sufficient capacity may not be obtained with either too large or too small proportion of the anode active material.

Figure 3:
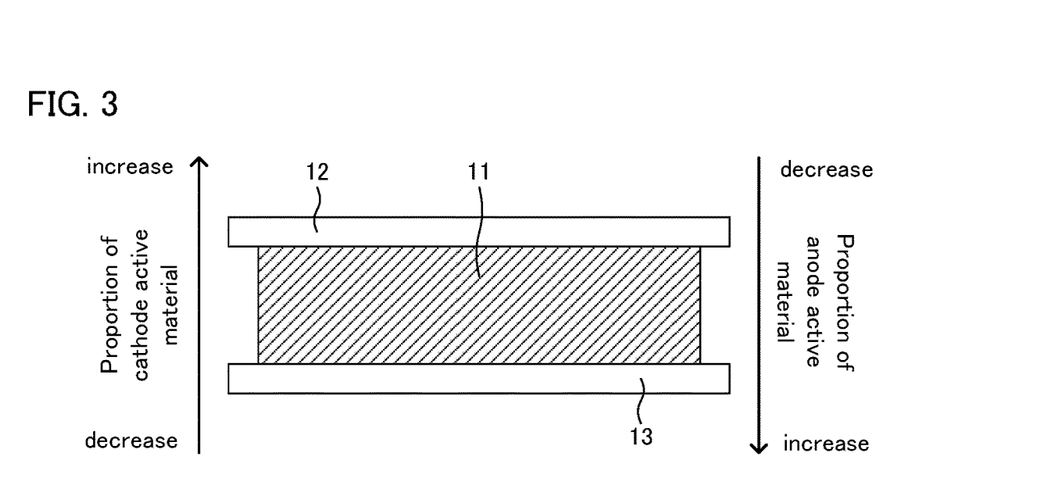
FIG. 3 is a schematic cross-sectional view explaining the lithium battery of the present disclosure.

Also, the proportion of the cathode active material in the mixture electrode layer preferably increases gradually from one surface towards the other surface in the thickness direction. Likewise, the proportion of the anode active material in the mixture electrode layer preferably increases gradually from one surface towards the other surface in the thickness direction. The reason therefor is to decrease the proportion of the active materials isolated in the mixture electrode by gradually increasing the proportion of the active materials. In particular, as shown in FIG. 3, the proportion of the cathode active material in mixture electrode layer 11 preferably increases gradually from one surface (anode current collector 13 side surface) toward the other surface (cathode current collector 12 side surface) in the thickness direction. Likewise, the proportion of the anode active material in mixture electrode layer 11 preferably increases gradually from one surface (cathode current collector 12 side surface) toward the other surface (anode current collector 13 side surface) in the thickness direction.

The increase in the proportion of the active materials may be stepwise and may be continuous. Examples of the mixture electrode layer in which the proportion of the active materials increase stepwise may include a mixture electrode layer comprising a plurality of layers and the proportion of at least one of the cathode active material and the anode active material in each layer is adjusted in the thickness direction. An example of such a mixture electrode layer is a mixture electrode layer comprising two layers that are a first layer and a second layer, wherein the proportion of the cathode active material is larger than the proportion of the anode active material in the first layer, and the proportion of the anode active material is larger than the proportion of the cathode active material in the second layer. Incidentally, the proportion may be appropriately selected in accordance with the kind of the active material. The proportion may be based on volume, may be based on weight, and may be based on mol.

The thickness of the mixture electrode layer is not limited. For example, the thickness is in a range of 1 μm to 1 cm, and preferably in a range of 10 μm to 1 mm. If the thickness of the mixture electrode layer is too small, sufficient capacity may not be obtained, and if the thickness of the mixture electrode layer is too large, electron conductivity in the mixture electrode layer may decrease and the high output may not be achieved.

5. Short Circuit Preventing Layer

It is preferable that a short circuit preventing layer is formed on at least one surface of the mixture electrode layer. The reason therefor is to securely prevent the occurrence of short circuits. Examples of the short circuit preventing layer may include, as shown in FIG. 2, short circuit preventing layer 4 that comprises cathode active material 1 and is formed on one surface of mixture electrode layer 11, and short circuit preventing layer 5 that comprises anode active material 2 and is formed on the other surface of the mixture electrode layer 11.

The material for the short circuit preventing layer is not limited, and examples thereof may include active materials and solid electrolyte materials. The thickness of the short circuit preventing layer is, for example, 0.01 μm or more, and preferably in a range of 0.1 μm to 500 μm. Also, the method for forming the short circuit preventing layer is not limited. For example, the method may be by pressing a first material for the short circuit preventing layer, pressing the mixture for the mixture electrode layer thereto then, and thereafter pressing a second material for the short circuit preventing layer thereto. Also, for example, the lithium ion battery may be produced by using current collectors having the short circuit preventing layers in a film shape on their surfaces.

6. Electrolyte Material

The electrolyte material is not limited to any particular material if it may become the ion conducting path between the cathode active material and the anode active material and may give and receive ions between the cathode active material and the anode active material. Examples thereof may include liquid electrolytes and solid electrolyte materials. It is preferable to use a liquid electrolyte among them. The reason therefor is that the liquid electrolyte may be added after the heat treatment for forming the insulating oxide.

As the liquid electrolyte, for example, a nonaqueous liquid electrolyte or an aqueous electrolyte may be used. A typical nonaqueous liquid electrolyte to be used contains a lithium salt and a nonaqueous solvent. Examples of the lithium salt may include inorganic lithium salts such as $LiPF_6$, $LiBF_4$, $LiClO_4$, and $LiAsF_6$. Examples of the nonaqueous solvent may include ethylene carbonate (EC), propylene carbonate (PC), dimethyl carbonate (DMC), diethyl carbonate (DEC), ethyl methyl carbonate (EMC), and the mixture thereof. The concentration of the lithium salt in the nonaqueous liquid electrolyte is, for example, 0.5 mol/kg to 3 mol/kg.

An ionic solution may be used as the nonaqueous liquid electrolyte and the nonaqueous solvent for example. Examples of the ionic solution may include N-methyl-N-propylpiperidinium bis(trifluoromethansulfonyl)amide (PP13TFSA), N-methyl-N-propylpyrrolidinium bis(trifluoromethansulfonyl)amide (P13TFSA), N-butyl-N-methyl-pyrrolidinium bis(trifluoromethansulfonyl)amide (P14TFSA), N,N-diethyl-N-methyl-N-(2-methoxyethyl) ammonium bis(trifluoromethansulfonyl)amide (DEMETFSA), and N,N,N-trimethyl-N-propylammonium bis(trifluoromethansulfonyl)amide (TMPATFSA).

A typical aqueous liquid electrolyte to be used contains a lithium salt and water. Examples of the lithium salt may include LiOH, LiCl, $LiNO_3$, and $CH_3CO_2Li$.

As the solid electrolyte material, for example, a sulfide solid electrolyte material or an oxide solid electrolyte material may be used. Above all, the material preferably does not react with the cathode active material or the anode active material upon the heat treatment for forming the insulating oxide.

7. Other Constitutions

Figure 4A:
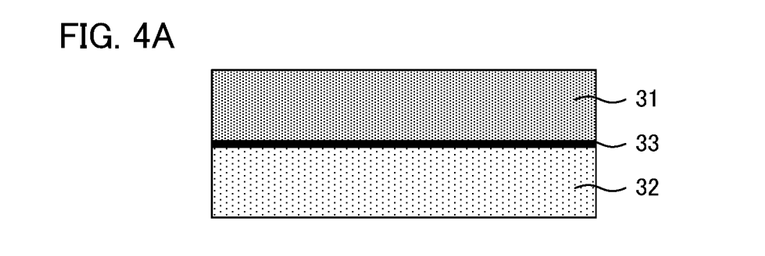
FIGS. 4A to 4C are schematic cross-sectional views exemplifying the structure of the lithium ion battery in the present disclosure.
Figure 4B:
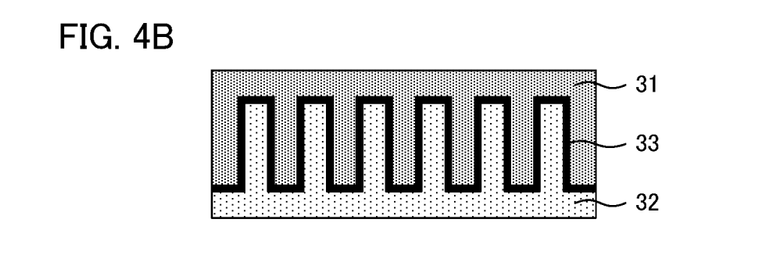
Figure 4C:
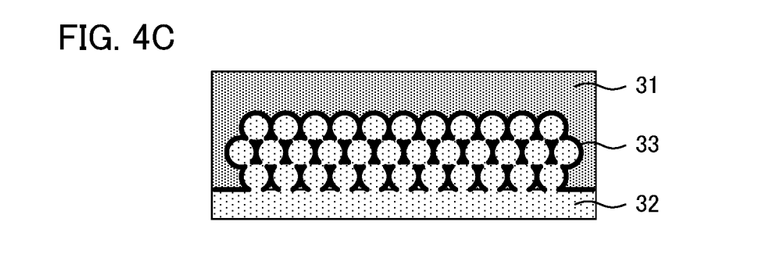

The lithium ion battery comprises at least the above described cathode active material, anode active material, insulating oxide, and liquid electrolyte material. The structure of the cathode active material and the anode active material are not limited. As shown in FIG. 2, an example thereof may be a mixture electrode layer in which the cathode active material and the anode active material are tangled. Also, additional examples thereof may include the structure in which cathode layer 31 having the cathode active material and anode layer 32 having the anode active material are flatly stacked as shown in FIG. 4A, the structure in which cathode layer 31 and anode layer 32 are stacked in a comb-shape as shown in FIG. 4B, and the structure in which cathode layer 31 contacts anode layer 32 in a so-called 3DOM structure as shown in FIG. 4C. In FIGS. 4A to 4C, insulating oxide 33 is formed in the interface between cathode layer 31 and anode layer 32. Also, in FIGS. 4A to 4C, it appears that cathode layer 31 contacts anode layer 32 in the entire region and insulating oxide 33 is formed in the entire interface of the region; however, in reality, the surfaces of cathode layer 31 and anode layer 32 have not a few bumps; thus, in a strict sense, there are regions cathode layer 31 contacts anode layer 32 and regions cathode layer 31 does not contact anode layer 32. Insulating oxide 33 is formed only in the region cathode layer 31 contacts anode layer 32.

Typically, the lithium ion battery further comprises a cathode current collector for collecting currents of the cathode active material and an anode current collector for collecting currents of the anode active material. Examples of the materials for the current collectors may include SUS, aluminium, copper, nickel, iron, titanium, and carbon.

8. Lithium Ion Battery

The lithium ion battery may be a primary battery, and may be a secondary battery, but is preferably a secondary battery among them. The reason therefor is to be repeatedly charged and discharged and useful as a car mounted battery for example. Also, examples of the shape of the lithium ion battery may include a coin shape, a laminate shape, a cylindrical shape, and a square shape.

B. Method for Producing Lithium Ion Battery

Next, the method for producing the lithium ion battery of the present disclosure is described.

The method for producing the lithium ion battery is a method comprising: a preparing step of preparing an electrode member in which a cathode active material contacts an anode active material; a heat treating step of heat treating the electrode member to form an insulating oxide with neither electron conductivity nor ion conductivity that contains at least one kind of an element included in the cathode active material and at least one kind of an element included in the anode active material, in an interface between the cathode active material and the anode active material; and an adding step of adding an electrolyte material that is an ion conducting path between the cathode active material and the anode active material, to the electrode member, during the preparing step or after the heat treating step; wherein the cathode active material comprises Li, at least one kind of Co, Mn, Ni, and Fe, and O; and the anode active material comprises at least one kind of Si, Li and Ti.

Figure 5A:
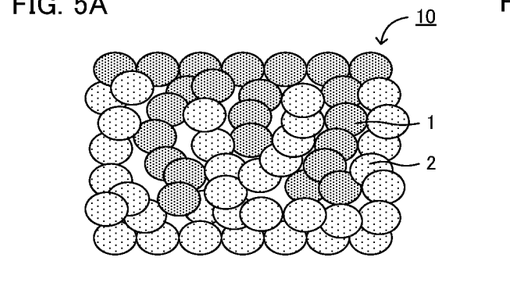
FIGS. 5A and 5B are schematic cross-sectional views illustrating an example of the method for producing the lithium ion battery of the present disclosure.
Figure 5B:
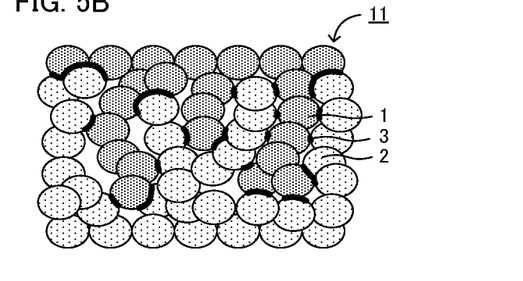

FIGS. 5A and 5B are the schematic cross-sectional views illustrating an example of the method for producing the lithium ion battery. In FIGS. 5A and 5B, first, electrode member 10 in which cathode active material 1 contacts anode active material 2 is prepared (FIG. 5A). Next, electrode member 10 is heat treated and insulating oxide 3 containing at least one kind of an element included in cathode active material 1 and at least one kind of an element included in anode active material 2 is formed in the interface between cathode active material 1 and anode active material 2 (FIG. 5B). This insulating oxide 3 is formed in neither the interface between cathode active materials 1 nor the interface between anode active materials 2; it is formed selectively in the interface between cathode active material 1 and anode active material 2.

According to the present disclosure, the insulating oxide is formed in a self-forming manner by the reaction of the cathode active material with the anode active material, so that the insulating oxide may be formed selectively in the required part; as the result, the distance between the cathode active material and the anode active material may be shortened while inhibiting short circuits, which results in shortening the ion conducting path, and thereby a lithium ion battery with low resistance of ion conductivity may be obtained.

The method for producing the lithium ion battery is hereinafter described in each step.

1. Preparing Step

The preparing step is a step of preparing an electrode member in which a cathode active material contacts an anode active material. Incidentally, the cathode active material and the anode active material are in the same contents as those described in "A. Lithium ion battery" above.

Figure 6A:
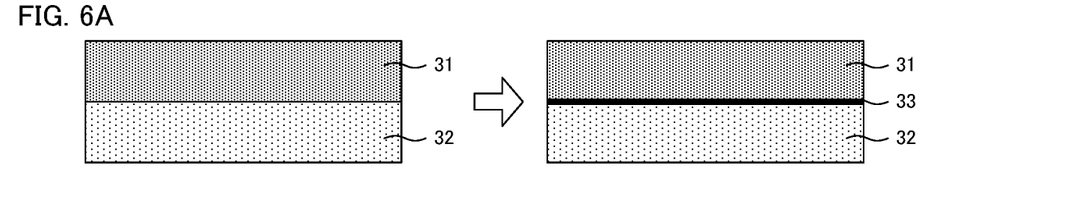
FIGS. 6A to 6C are schematic cross-sectional views exemplifying the electrode member in the present disclosure.
Figure 6B:
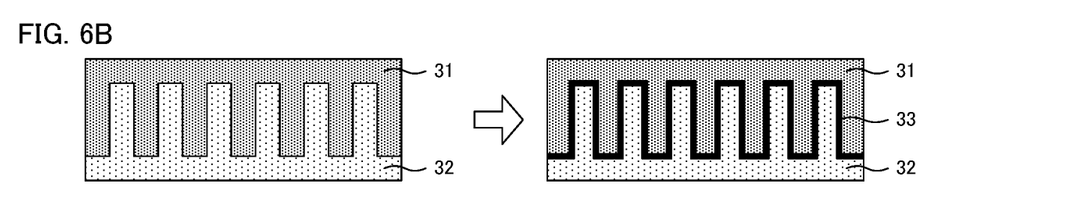
Figure 6C:
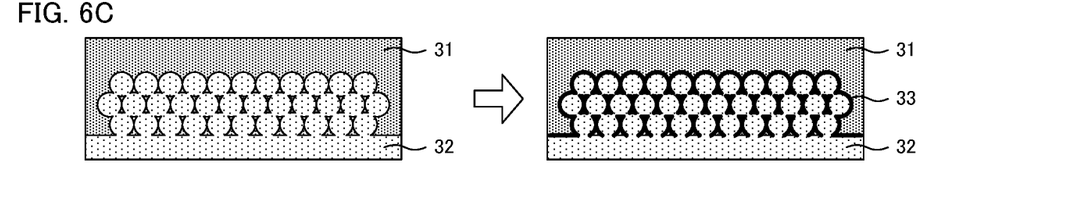

The electrode member is not limited to any particular member if the cathode active material contacts the anode active material therein. An example of the electrode member may be, as shown in FIG. 5A, a mixture electrode layer in which the cathode active material and the anode active material are tangled. Also, additional examples of the electrode member may include a member in which cathode layer 31 and anode layer 32 are flatly stacked as shown in FIG. 6A, a member in which cathode layer 31 and anode layer 32 are stacked in a comb-shape as shown in FIG. 6B, and a member in which cathode layer 31 contacts anode layer 32 in a so-called 3DOM structure as shown in FIG. 6C. In FIGS. 6A to 6C, insulating oxide 33 is formed in the interface between cathode layer 31 and anode layer 32 by conducting the later describe heat treating step. Also, in FIGS. 6A to 6C, it appears that cathode layer 31 contacts anode layer 32 in the entire region and insulating oxide 33 is formed in the entire surface of the region; however, in reality, the surfaces of cathode layer 31 and anode layer 32 have not a few bumps; thus, in a strict sense, there are regions cathode layer 31 contacts anode layer 32 and regions cathode layer 31 does not contact anode layer 32. Insulating oxide 33 is formed only in the region cathode layer 31 contacts anode layer 32.

2. Heat Treating Step

The heat treating step is a step of heat treating the electrode member to form an insulating oxide that contains at least one kind of an element included in the cathode active material and at least one kind of an element included in the anode active material, in the interface between the cathode active material and the anode active material.

The heat treating temperature is not limited to any particular temperature if it allows the intended insulating oxide to be formed. For example, the temperature is preferably 100° C. or more, more preferably 200° C. or more, and further preferably 300° C. or more. Meanwhile, the heat treating temperature is, for example, preferably 900° C. or less, more preferably 800° C. or less, and further preferably 700° C. or less.

The atmosphere upon the heat treating is not limited and examples thereof may include an oxygen-containing atmosphere, an inert gas atmosphere, and a vacuum atmosphere. Examples of the oxygen-containing atmosphere may include an air atmosphere, the mixture atmosphere of oxygen and inert gas, and a pure oxygen atmosphere. Examples of the inert gas atmosphere may include nitrogen gas and argon gas. For example, when it is difficult to form the desired insulating oxide since the oxygen concentration is too high, it is preferable to lower the oxygen concentration to the appropriate level. Also, for example, when the active materials are reduced and decomposed at the temperature the insulating oxide is formed, it is preferable to conduct the heat treating in an oxygen-containing atmosphere (such as an air atmosphere) to inhibit the reduction decomposition reaction. The heat treating time is, for example, preferably in a range of 1 minute to 24 hours, and more preferably in a range of 10 minutes to 10 hours. Examples of the method for heat treating may include a method using a burning furnace.

Also, the formation of the insulating oxide and the composition of the formed insulating oxide may be confirmed by, for example, an X-ray diffraction (XRD) measurement and STEM-EDX (JEOL).

3. Adding Step

The adding step is a step of adding an electrolyte material to the electrode member during the preparing step or after the heat treating step. The electrolyte material is in the same contents as those described in "A. Lithium ion battery" above.

The adding step is, for example, preferably after the heat treating step if the electrolyte material is a liquid electrolyte, and preferably during the preparing step if the electrolyte material is a solid electrolyte material.

Incidentally, the present disclosure is not limited to the above embodiments. The embodiments are exemplification, and other variations are intended to be included in the technical scope of the present disclosure if they have substantially the same constitution as the technical idea described in the claim of the present disclosure and offer similar operation and effect thereto.

EXAMPLES

The present disclosure is hereinafter described in more details with reference to Examples.

Example 1

Conducted was a supporting experiment to form an insulating oxide in the interface between a cathode active material and an anode active material.

Figure 7:
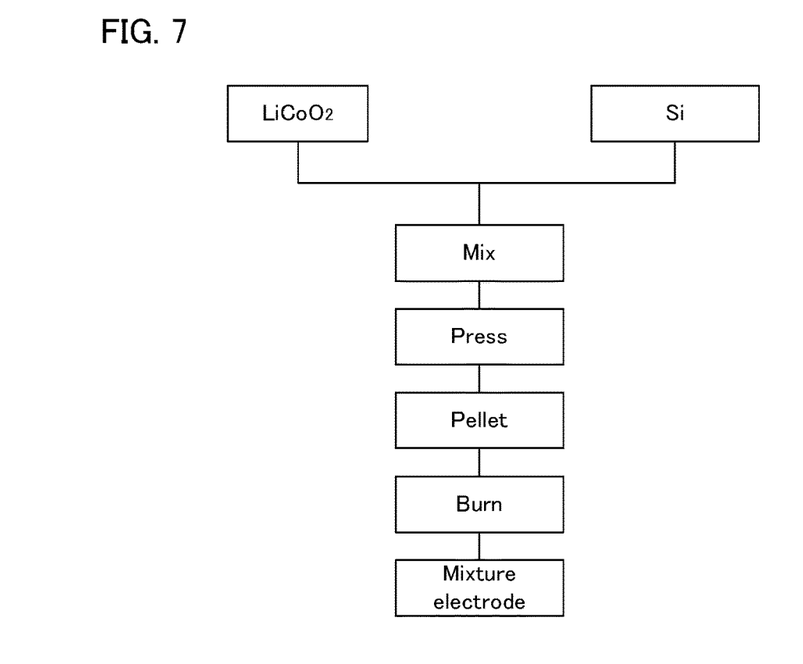
FIG. 7 is a flow chart for preparing a mixture electrode in Example 1.

A mixture electrode of the cathode active material and the anode active material was produced in accordance with the flow chart shown in FIG. 7. Prepared were $LiCoO_2$ as the cathode active material, and powders of Si as the anode active material, which were weighed so as to be $LiCoO_2$:Si=1:4 in the molar ratio, and mixed by an agate motor. The obtained mixture was pressed at 1 ton to obtain a pellet. The powders of the cathode active material were placed on one surface of the obtained pellet, and the powders of the anode active material were placed on the other surface of the obtained pellet, and the pellet was pressed at 2 tons to obtain a molded body. The obtained molded body was burned at 900° C. in an air atmosphere for 1 hour and thereby a mixture electrode was obtained.

[Evaluation]

(X-Ray Diffraction Measurement)

Figure 9:
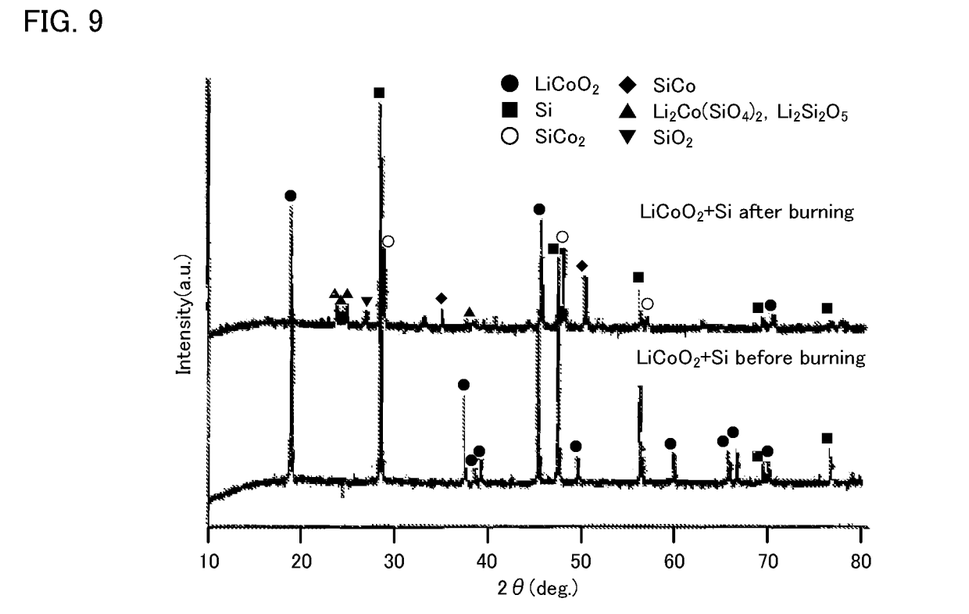
FIG. 9 is the result of an XRD measurement in Example 1.
Figure 10:
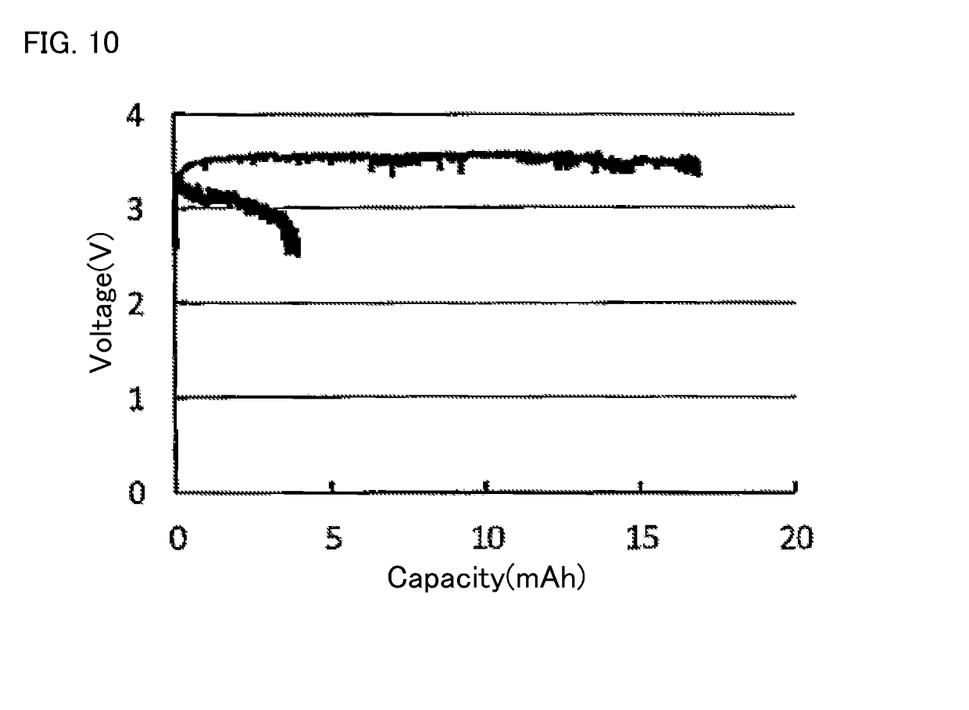
FIG. 10 is the measurement result that shows charge and discharge curves in Example 2.
Figure 11:
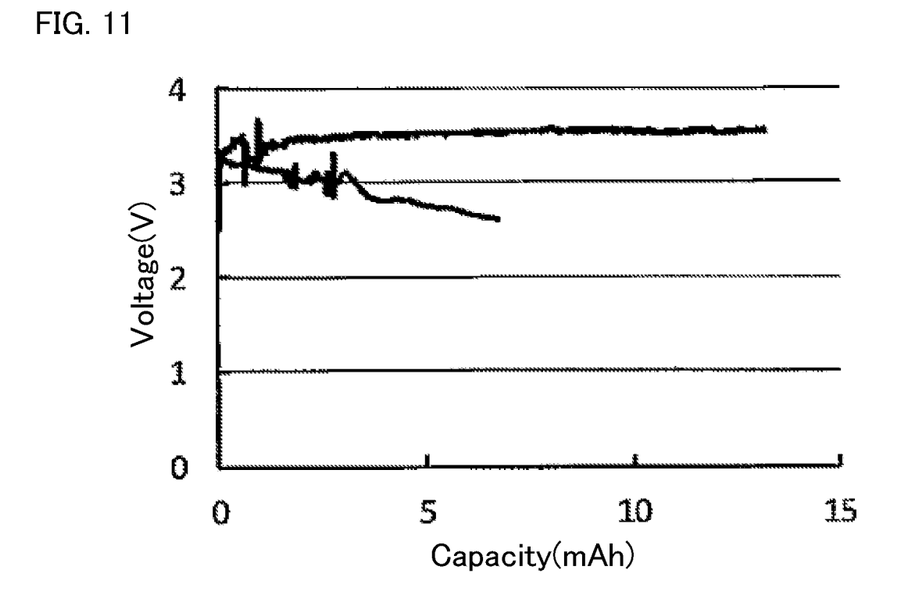
FIG. 11 is the measurement result that shows charge and discharge curves in Example 3.
Figure 12:
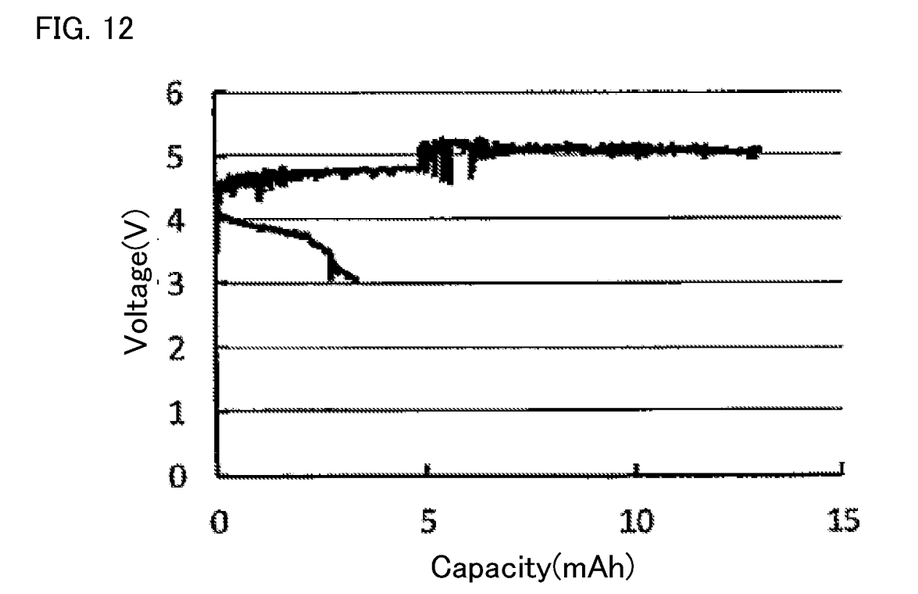
FIG. 12 is the measurement result that shows charge and discharge curves in Example 4.
Figure 13:
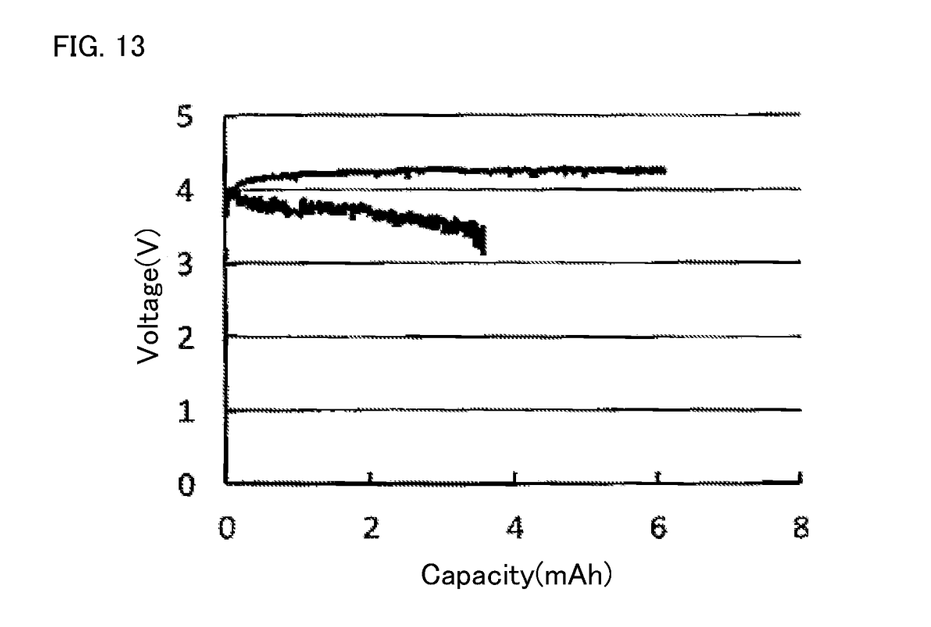
FIG. 13 is the measurement result that shows charge and discharge curves in Example 5.
Figure 14:
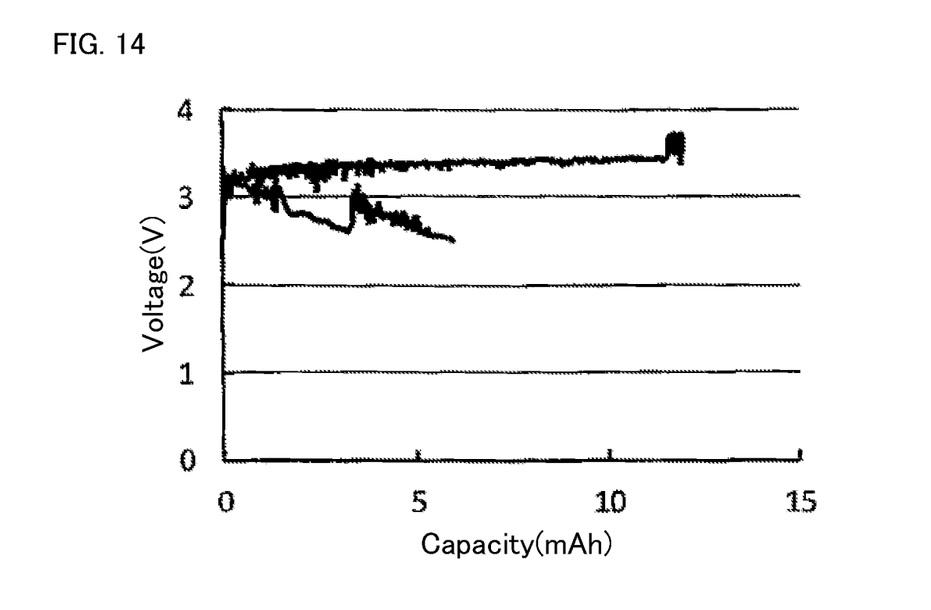
FIG. 14 is the measurement result that shows charge and discharge curves in Example 6.

An X-ray diffraction (XRD) measurement was conducted for the mixture electrode obtained in Example 1. A CuKα ray was used for the measurement, and the conditions for the measurement were: 2θ=10° to 80°, 5°/min., and 0.02° per step. The result is shown in FIG. 9. As shown in FIG. 9, in Example 1, the peaks of $SiO_2$ and the peaks of $Li_2Co(SiO_4)_2$ and $Li_2Si_2O_5$ were observed. Here, $SiO_2$, $Li_2Co(SiO_4)_2$, and $Li_2Si_2O_5$ fall under the insulating oxide in the present disclosure. Thus, it was confirmed that the insulating oxide was formed in the interface between the cathode active material and the anode active material.

Example 2

Figure 8:
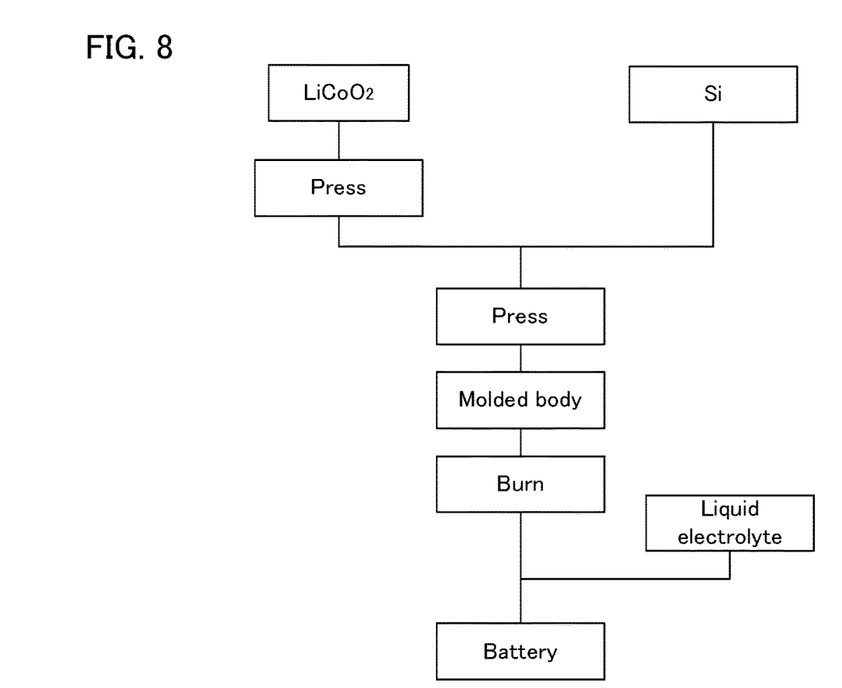
FIG. 8 is a flow chart for preparing a battery in Example 2.

A battery was produced in accordance with the flow chart shown in FIG. 8. Prepared were $LiCoO_2$ as the cathode active material, and Si as the anode active material. The powders of the cathode active material were pressed at 1 ton to obtain a pellet. The powders of the anode active material were placed on one surface of the obtained pellet and pressed at 2 tons to obtain a molded body. The obtained molded body was burned at 900° C. in an air atmosphere for 1 hour and thereby an evaluation electrode was obtained.

A solute $LiPF_6$ was mixed, in the proportion of 1 mol/L, with a solvent that was a mixture solution of ethylene carbonate, dimethyl carbonate and ethyl methyl carbonate, and thereby a nonaqueous liquid electrolyte was obtained.

The obtained evaluation electrode was vacuum-impregnated with the nonaqueous liquid electrolyte, connected respectively to an aluminum foil of 15 μm thick as the cathode current collector and to a copper foil of 10 μm thick as the anode current collector, stored in a 2032 type coin cell made of SUS prepared as the battery case, and thereby an evaluation battery was produced.

Example 3

An evaluation battery was produced in the same manner as in Example 2 except that $LiNi_{1/3}Mn_{1/3}Co_{1/3}O_2$ was used as the cathode active material.

Example 4

An evaluation battery was produced in the same manner as in Example 2 except that $LiNi_{0.5}Mn_{1.5}O_4$ was used as the cathode active material.

Example 5

An evaluation battery was produced in the same manner as in Example 2 except that a Li metal was used as the anode active material, and the conditions for burning the molded body was changed to at 100° C. for 3 hours.

Example 6

An evaluation battery was produced in the same manner as in Example 2 except that the mixture electrode obtained in Example 1 was used as the evaluation electrode.

Comparative Example 1

The mixture obtained in Example 1 (the mixture before burning) was pressed at 2 tons to obtain a pellet. An evaluation battery was produced in the same manner as in Example 2 except that the obtained pellet was used as the evaluation electrode.

[Evaluation]

(Charge and Discharge Test)

A charge and discharge test was conducted for the evaluation batteries obtained in Examples 2 to 6 and Comparative Example 1. In particular, constant current charging was conducted at 0.01 C for 20 hours per 160 mAh/g, and thereafter constant current discharging was conducted at 0.01 C to the lower limit of 2.5 V. The results are shown in FIG. 10 to FIG. 14.

As shown in FIG. 10 to FIG. 14, in Examples 2 to 6, it was confirmed that the lithium ion battery with the insulating oxide formed in the interface between the cathode active material and the anode active material was charged and discharged. The reason therefor was presumably because the distance between the cathode active material and the anode active material was shortened while the self-formed insulating oxide inhibited short circuits, which resulted in shortening the ion conducting paths.

In contrast, the charge and discharge of the battery was not confirmed in Comparative Example 1. The reason therefor was presumably because the insulating oxide was not formed in the interface between the cathode active material and the anode active material, and thus the cathode active material contacted with the anode active material caused short circuits.

Shortening the ion conducting paths as in Examples 2 to 6 allowed the decrease in the resistance of ion conductivity compared to the batteries in which the ion conducting paths are long, such as the lithium ion secondary battery having a separator as described in Patent Literature 1, and the all solid state lithium ion secondary battery having a solid electrolyte material layer described in Patent Literature 2.

In this manner, it was confirmed that the lithium ion battery with low resistance of ion conductivity was obtained by self-forming the insulating oxide.

REFERENCE SIGNS LIST

1 cathode active material layer
2 anode active material layer
3 insulating oxide
4, 5 short circuit preventing layer
6 electrolyte material
11 mixture electrode
12 cathode current collector
13 anode current collector
100 lithium ion battery

What is claimed is:

1. A method for producing a lithium ion battery comprising:
   a preparing step of preparing an electrode member in which a cathode active material contacts an anode active material,
   a heat treating step of heat treating the electrode member to form an insulating oxide with neither electron conductivity nor ion conductivity that contains at least one kind of an element included in the cathode active material and at least one kind of an element included in the anode active material, in an interface between the cathode active material and the anode active material, and
   an adding step of adding an electrolyte material that is an ion conducting path between the cathode active material and the anode active material, to the electrode member, during the preparing step or after the heat treating step, wherein if the electrolyte material is added during the preparing step, the contact of the cathode material and the anode material is maintained, the cathode active material comprises Li, at least one kind of Co, Mn, Ni, and Fe, and O, and the anode active material comprises at least one kind of Si, Li and Ti.

2. The method for producing a lithium ion battery according to claim 1, wherein the insulating oxide comprises at least one kind of $SiO_2$, $Li_2O$, and $TiO_2$.

3. The method for producing a lithium ion battery according to claim 1, wherein the cathode active material comprises at least one kind of $Li_xMO_2$ ($0.5<x<1.5$; M is at least one kind of Co, Mn, and Ni), $LiMn_2O_4$, $LiNi_{0.5}Mn_{1.5}O_4$, $LiCoMnO_4$, and $LiMPO_4$ (M is at least one kind of Fe, Co, Mn, and Ni).

4. The method for producing a lithium ion battery according to claim 1, wherein the anode active material comprises at least one kind of a simple substance of Si, a simple substance of Li, and $Li_4Ti_5O_{12}$.

5. The method for producing a lithium ion battery according to claim 1, wherein the electrolyte material is a liquid electrolyte.

6. The method for producing a lithium ion battery according to claim 1, wherein an ion conductivity of the insulating oxide at a normal temperature of 25° C. is $1.0\times10^{-8}$ S/cm or less.

* * * * *